United States Patent
Schaerer et al.

(10) Patent No.: US 10,302,112 B2
(45) Date of Patent: May 28, 2019

(54) NODE ELEMENT FOR A FURNITURE SYSTEM HAVING A THREE-DIMENSIONAL LOAD-BEARING TUBE STRUCTURE

(71) Applicant: USM Holding AG, Muri bei Bern (CH)

(72) Inventors: Alexander Schaerer, Muri bei Bern (CH); Stefan Krenger, Thun (CH); Thomas Dienes, Bern (CH)

(73) Assignee: USM Holding AG, Muri Bei Bern (CH)

( * ) Notice: Subject to any disclaimer, the term of this patent is extended or adjusted under 35 U.S.C. 154(b) by 290 days.

(21) Appl. No.: 14/566,160

(22) Filed: Dec. 10, 2014

(65) Prior Publication Data

US 2015/0167713 A1 Jun. 18, 2015

(30) Foreign Application Priority Data

Dec. 13, 2013 (EP) .................................. 13405139

(51) Int. Cl.
| | | |
|---|---|---|
| *E04B 1/19* | (2006.01) | |
| *F16B 7/18* | (2006.01) | |
| *A47B 47/00* | (2006.01) | |
| *H01R 4/56* | (2006.01) | |
| *H01R 11/09* | (2006.01) | |

(Continued)

(52) U.S. Cl.
CPC .......... *F16B 7/185* (2013.01); *A47B 47/0016* (2013.01); *H01R 4/56* (2013.01); *H01R 11/09* (2013.01); *H01R 24/38* (2013.01); *A47B 2230/03* (2013.01); *E04B 1/1906* (2013.01); *E04B 2001/196* (2013.01);

(Continued)

(58) Field of Classification Search
CPC ............. Y10T 403/342; Y10T 403/347; A47B 47/0016; A47B 2230/03; E04B 1/1906; E04B 2001/1927; E04B 2001/196; F16B 7/185; H01R 33/20; H01R 33/22; H01R 4/64; H01R 9/2416; H01R 25/14; H01R 25/145
USPC .................................................. 403/169–176
See application file for complete search history.

(56) References Cited

U.S. PATENT DOCUMENTS 2,546,979 A * 4/1951 Cozzone .............. A63H 33/107
403/173
3,331,621 A * 7/1967 Bagnulo ................. F16L 13/11
285/286.2

(Continued)

FOREIGN PATENT DOCUMENTS

| | | |
|---|---|---|
| CH | 429317 A | 1/1967 |
| DE | 3931225 A1 | 4/1991 |
| EP | 0980120 A2 | 2/2000 |

OTHER PUBLICATIONS

Japanese Office Action dated Oct. 9, 2018 issued in corresponding JP Application No. 2014-251601 with an English Translation.

*Primary Examiner* — Amber R Anderson
*Assistant Examiner* — Nahid Amiri
(74) *Attorney, Agent, or Firm* — Birch, Stewart, Kolasch & Birch, LLP

(57) ABSTRACT

A node element for a furniture system having a three-dimensional load-bearing tubular structure comprises a plurality of connection points for the mechanical fastening of two or more tubes. It further comprises two regions which are electrically insulated from each other and which are arranged such that two electrical polarities can be coaxially tapped at the connection points for the tubes.

9 Claims, 2 Drawing Sheets

(51) Int. Cl.
*H01R 24/38* (2011.01)
*H01R 103/00* (2006.01)

(52) U.S. Cl.
CPC .. *E04B 2001/1927* (2013.01); *H01R 2103/00* (2013.01); *Y10T 403/342* (2015.01)

(56) References Cited

U.S. PATENT DOCUMENTS

| | | | | |
|---|---|---|---|---|
| 3,632,147 A * | 1/1972 | Finger | ................. | A47F 5/14 |
| | | | | 403/171 |
| 3,671,060 A * | 6/1972 | Kyburz | ................. | F16L 25/021 |
| | | | | 285/328 |
| 3,921,360 A | 11/1975 | Baldwin | | |
| 4,438,615 A * | 3/1984 | Wendel | ................. | E04B 1/1906 |
| | | | | 403/171 |
| 4,822,199 A * | 4/1989 | Nehls | ................. | E04B 1/1906 |
| | | | | 403/171 |
| 4,866,902 A * | 9/1989 | Arciszewski | ......... | E04B 1/1906 |
| | | | | 403/171 |
| 4,915,533 A * | 4/1990 | de la Haye | ........... | E04B 1/1906 |
| | | | | 403/171 |
| 5,051,019 A * | 9/1991 | Kohl | .................... | E04B 1/1906 |
| | | | | 403/171 |
| 5,116,193 A * | 5/1992 | Takizawa | .............. | E04B 1/1906 |
| | | | | 403/171 |
| 5,487,691 A * | 1/1996 | Chiu | ..................... | A63H 33/10 |
| | | | | 446/102 |
| 6,341,566 B1 * | 1/2002 | Hwang | ................ | A47B 47/005 |
| | | | | 108/180 |
| 6,672,789 B2 * | 1/2004 | Chen | ...................... | F16B 7/185 |
| | | | | 403/171 |
| 7,097,146 B2 * | 8/2006 | Tsai | ...................... | F16B 7/185 |
| | | | | 248/638 |
| 7,322,873 B2 * | 1/2008 | Rosen | ................. | A63H 33/042 |
| | | | | 446/124 |
| 8,585,312 B1 * | 11/2013 | Kosak | .................... | G09B 25/04 |
| | | | | 403/171 |
| 2008/0139040 A1 | 6/2008 | Hsu et al. | | |

* cited by examiner

NODE ELEMENT FOR A FURNITURE SYSTEM HAVING A THREE-DIMENSIONAL LOAD-BEARING TUBE STRUCTURE

TECHNICAL FIELD

The invention relates to a node element for a furniture system having a three-dimensional load-bearing tubular structure, wherein the node element comprises a plurality of connection points for the mechanical fastening of two or more tubes and wherein the node element has two regions which are electrically insulated from each other. The invention further relates to a furniture system having node elements of this type and to a method for producing such a node element.

PRIOR ART

Furniture systems having a three-dimensional load-bearing tubular structure, comprising a plurality of tubes and a plurality of three-dimensional node elements, wherein two or more tubes are fastenable to connection points of one of the three-dimensional node elements, are known.

Thus CH 429 317 (U. Schärer's Söhne), for instance, discloses a tube connection for the frame construction, in which, for the detachable connection of the tube ends one to another, a connecting head having respectively a threaded bore to each tube end is provided. The threaded bores run in the respective axial direction. In these can be screwed head screws, which project into the tube end and on the shank of which are found two wedge sleeves, which abut one against the other with the wedge surface and, with the end face facing away therefrom, against the connecting head or against the screw head and, when the screw is tightened, secure the tube end on the inside.

It is a requirement to supply electric power to consuming units disposed on furniture items and furniture systems, such as, for example, light fittings. To this end, the furniture items can have, for example, openings, through which supply cables can be run from the rear side. Ducts in which such supply cables can be inconspicuously or invisibly run are likewise customary.

Also within modular furniture systems having three-dimensional load-bearing tubular structures, current-carrying devices are known. EP 0 980 120 A2 (H. Breuer) relates, for example, to a universal bracket for the erection of shelves, cabinets, supporting structures, etc. Inside the universal bracket is disposed an electrical conduit, to which consuming units, for example light sources, can be connected by means of current collectors. The universal bracket preferably comprises a conductor profile made of an insulating material, which in its cross section has a recess in which the electrical conduit is accommodated; the conductor profile can support a neutral conductor, a phase, and, if necessary, an earthing conductor. The tapping is realized by means of current collectors, which likewise consist of an insulating material and lead in the connected current conductor to the conductors arranged centrally in the profile, the current of the centrally arranged neutral conductor being tapped by a spike, that of the phases by an annular contact. The conductor profile can be of self-supporting configuration, so that an additional support profile is no longer necessary. The universal bracket can cooperate with framework nodes, wherein three current-carrying axes can intersect at a node.

DE 39 31 225 A1 (E. Burgstaller) relates to an apparatus for producing display stands which enables simple assembly and likewise encloses an electrical power supply. It comprises connecting nodes having a cube-shaped housing for the connection of mounting elements. The housing comprises pin-insertion openings, in which pins of the mounting elements are received. The connecting node further contains a central electrical conductor system, which for each pin-insertion opening has a part of an electrical connection device, which part can be conductively connected to a complementary part in the pin region of the mounting element. Notably, the pins comprise protruding plug arrangements, which are connected to connecting leads inside the mounting elements. The connecting node comprises a cube-shaped central electrical conductor system, which has centrally in the respective outer surfaces socket recesses, which are wired together.

The known systems are relatively complicated, and the used contact devices, for example bushings and plugs, are sensitive to mechanical influences, particularly in the region of the node elements.

REPRESENTATION OF THE INVENTION

The object of the invention is to create a node element for a furniture system having a three-dimensional load-bearing tubular structure, which node element belongs to the technical field stated in the introduction and has a simple structure and mechanically robust devices for the power supply.

The achievement of the object is defined by the features of Claim 1. According to the invention, the two mutually electrically insulated regions are arranged such that two electrical polarities can be coaxially tapped at the connection points for the tubes.

The electrical connection can thus be created in a simple manner and a relatively large amount of space is available for the actual contacts. The relative rotary position of the tubes and of the node elements is not critical for the electrical contacting.

A three-dimensional node element within the meaning of the invention enables the connection of a plurality of tubes, which in the fastened state do not necessarily have to lie on the same line or in the same plane. Node elements which have six connection parts disposed on the outer side of an imaginary cube are particularly preferred. Correspondingly, with tubes and node elements of this type, furniture items can be constructed, the structural elements (tubes) of which run along a three-dimensional rectangular grid. The node elements themselves can be correspondingly cube-shaped or have a different suitable shape, for example that of a sphere.

Coaxial means in each case that the inner insulated region is partially or—preferably—wholly enclosed by the outer insulated region.

A furniture system according to the invention thus comprises a plurality of tubes and a plurality of such three-dimensional node elements. At least one of the tubes here has two mutually insulated current conductors for carrying current of a first polarity and a second polarity along the tube, such that, following the mechanical fastening of the tube to the node element, the two current conductors are electrically connected to the two mutually electrically insulated regions of the node element. Current can thus be carried bipolarly from tube to tube. Within the principle according to the invention, extensions having three or even more poles) are also possible (for example, even if a plurality of independent power circuits are required).

The furniture system can be constituted, for instance, by a shelf system, a cabinet system, a drawer system or a system comprising different of the said components. The furniture system is, in particular, of modular construction, i.e. many different configurations can be constructed virtually without restriction with a limited number of basic elements (tubes, node elements and fixtures and fittings).

The cross section of the tubes can assume different shapes. Thus it can have, for instance, the external shape of a circle or of a regular polygon, but irregular closed or even open shapes are also possible.

It is not essential for all tubes and all node elements to have the aforementioned conductor characteristics. Within a furniture system according to the invention, tubes and node elements without conductive function can be combined with the conductive elements.

Preferably, the at least one node element comprises a plurality of mutually electrically insulated, coaxially arranged regions, so that electric current can be carried bipolarly from each tube fastenable to the node element into any other tube fastened to the node element. The node element can in this way be simply configured, with no need for junctions or separate conductors, such as cables or the like.

Preferably, the at least one node element comprises an outer part made of a conductive material, a therein accommodated inner part made of a conductive material, and an intervening separation layer of electrically insulating material. With just three parts, a node element can thus be configured with the necessary mechanical and electrical functions.

A node element of this type can be produced, in particular, by the following steps:
a) a workpiece made of a conductive material is machined, in particular by a milling and/or turning operation, such that two coaxially existing parts which are fully separated from each other are obtained.
b) Then a separation layer of electrically insulating material is introduced between the two parts.

Fully separated from each other here means that the two parts are nowhere any longer connected by the original material. In three-dimensional node elements, the two parts will generally exist, however, in a non-dismantlable arrangement, i.e. they cannot be separated from each other non-destructively.

In this way, three-dimensionally conductive node elements of relatively complex geometry can also be produced with a least possible number of parts. Correspondingly, optimal mechanical stability with superb electrical conductor characteristics is obtained.

Alternatively, the inner part and the outer part are produced separately and subsequently fastened to each other. Depending on the geometry of the node element, it is in this case necessary to construct the outer parts from a plurality of parts, which, following the insertion of the inner part, are connectable to one another.

Advantageously, a first of the two electrical polarities is tappable at the outer part. This enables particularly simple contacting.

In a preferred embodiment, the inner part of the at least one node element has threads for fastening of the two or more tubes. These enable a simple and stable mechanical connection of the tubes to the node elements. The tubes can moreover be clamped against the node elements, so that axial play is precluded.

Preferably, an outer surface of the at least one node element forms a first of the two electrically insulated regions, and the threads form a second of the two electrically insulated regions. The contacting between the tubes and the node elements can thus be realized particularly simply. Elements which are anyway required for the mechanical fastening and are thus present, namely the threads for the axial fixing and the outer surface for the supporting of the tubes, are also at the same time used for the contacting.

In addition to screw connections, other fastening mechanisms for the connection between tube and node element are also possible, for example clamping connections, insertion grooves, positive connections with locking parts (for example safety bolts), or the like.

Preferably, the outer part and the inner part are produced from a metallic material, notably a conductive metallic material. A suitable material is, for instance, brass (if necessary, chrome-plated).

Other materials can likewise be used, the parts being able to be of solid or multipart, or multilayered construction.

Preferably, the two mutually insulated current conductors for carrying current in at least one of the tubes are arranged coaxially to each other. The coaxial arrangement of the conductors in the node elements is thus continued in the tubes. A particularly simple conductor arrangement is thus obtained in all involved structural elements of the furniture system.

Preferably, the at least one tube comprises a structural tube element made of a conductive material, which serves to carry the first polarity, and an inner conductor, accommodated in insulated arrangement in the structural tube element, for carrying the second polarity. The first polarity is constituted, in particular, by the neutral conductor (earth). The structure of the tube is thus particularly simple.

Advantageously, the furniture system comprises connectors, which are attachable, on the one hand, to the node elements and, on the other hand, to the tubes, and at the same time create a mechanically loadable fastening and an electrical contacting between the contact element and the tube attached thereto. The connectors can comprise specific elements which ensure the stability of the mechanical connection and the reliability of the electrical connection. The connectors can comprise, for instance, screwing means, which can cooperate with the aforementioned threads in the node elements and thus, inter alia, create the electrical contact for the second polarity. In addition, contact elements can be present, which, by a suitable mechanism, are pressed against a conductive surface of the node elements and thus create the electrical contact for the first polarity.

In a preferred embodiment, the connectors comprise the following:
a) a mechanical fastening element, which, for the securement of a tube to be fastened to the connector, can be tensioned by means of a screw, wherein the screw is arranged in such a way on the mechanical fastening element that it can cooperate with a thread of one of the node elements, and
b) an electrical contact element for contacting the screw and the inner conductor of the tube held by the mechanical fastening element.

Connectors of this type create a secure connection, wherein the screw is used both for the tensioning of the mechanical fastening element and for the electrical connection of one of the polarities, thereby reducing the component cost.

The described connectors are also beneficial, independently of the inventive node elements and tubes, for the electrical connection of structural elements of modular furniture systems.

In an alternative to separate connectors, the tubes can be directly provided with fastening elements with which they can be fastened to the node elements, wherein the fastening elements are configured such that electrical contacting takes place.

From the following detailed description and the totality of the patent claims, further advantageous embodiments and feature combinations of the invention are obtained.

BRIEF DESCRIPTION OF THE DRAWINGS

The drawings used to illustrate the illustrative embodiment show in.

In the figures, same parts are provided in principle with same reference symbols.

Ways to Implement the Invention

Figure 1:
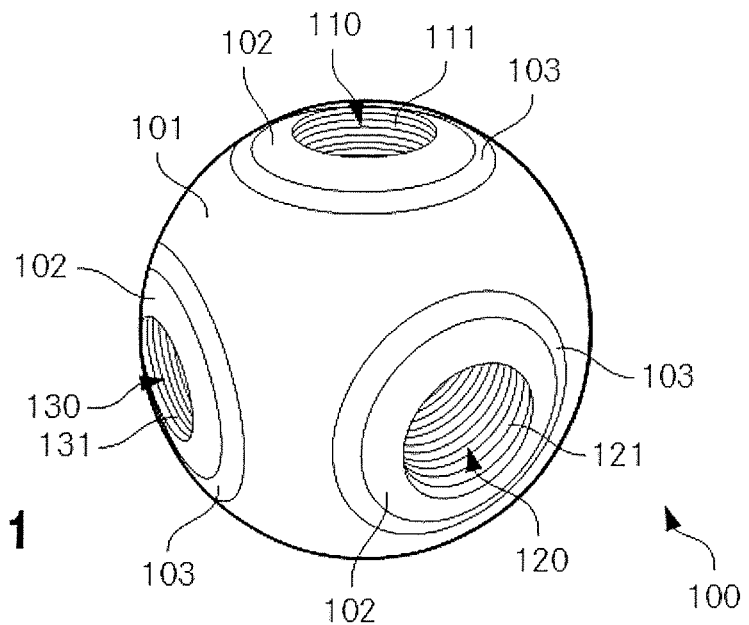
FIG. 1 a perspective view of a node element for the furniture system according to the invention.
Figure 2:
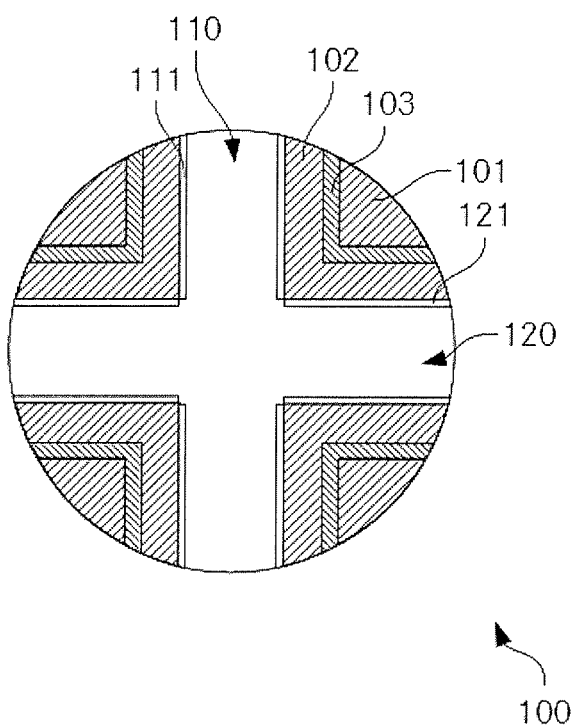
FIG. 2 a cross section through the node element.

FIG. 1 shows a perspective view of a node element for the furniture system according to the invention, FIG. 2 shows a cross section through the node element in a plane comprising two mutually perpendicular axes of two threaded bores.

The node element 100 is configured as a spherical connecting head. This is disposed, as described below in connection with FIG. 3, between those ends of tubes of the furniture system which are to be connected. The node element comprises three threaded bores 110, 120, 130, the axes of which respectively run perpendicular to one another and diametrically through the centre point of the sphere. Correspondingly, the outer surface of the node element 100 has six openings, through which screws cooperating with the threads 111, 121, 131 can be introduced. Thus, with the aid of the node element 100, two to six tubes can be connected to one another, according to requirement.

The node element 100 consists of a one-piece outer part 101, a one-piece inner part 102, and an intervening electrical insulating layer 103. The threaded bores 110, 120, 130 run solely through the inner part 102. The outer part 101 and the inner part 102 are produced from chrome-plated brass, the insulating layer 103 consists of a suitable plastic.

The node element is produced as follows: From a solid block of brass, a sphere is produced by conventional milling and/or turning operations, after which the continuous bores are produced and the threads milled.

In a following step, rings are milled at a predefined interval around the threaded bore. Rings of adjacent threaded bores meet at a predefined distance to the threaded bore which respectively runs perpendicular to the ring axis. Two coaxially arranged, non-dismantlable, yet fully mutually separated parts are thereby produced, the outer part 101 and the inner part 102 accommodated therein. These two parts are now jointly chrome-plated in a manner which is known per se.

The outer part 101 and the inner part 102 are next held by means of suitable holding devices in a relative position in which the axes of the respective openings precisely coincide. In this position, the plastic for the insulating layer 103 is injected between the outer part 101 and the inner part 102. Following completed curing of the plastic, the finished node element 100 is obtained.

Figure 3:
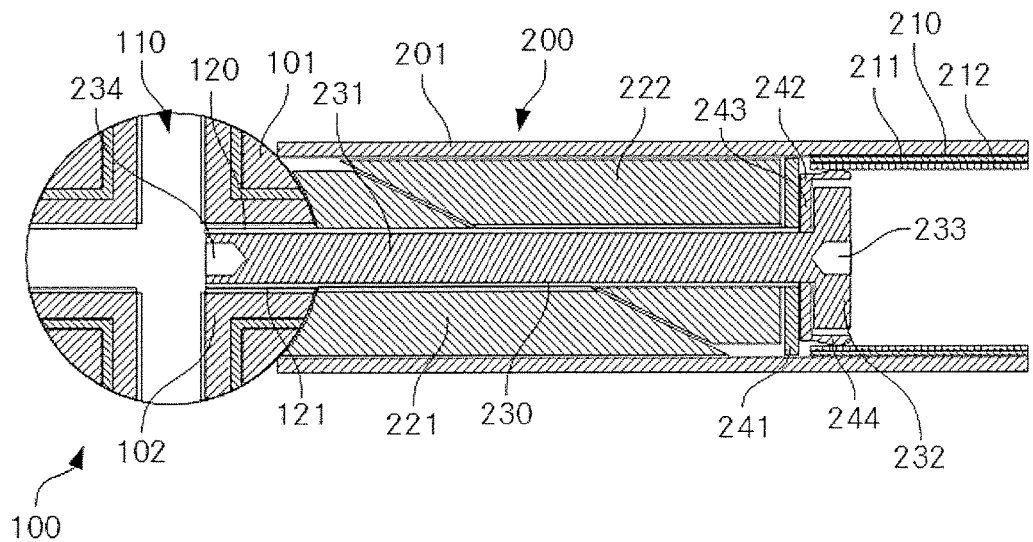
FIG. 3 a cross section through the connection of a node element to a tube of the furniture system according to the invention.

FIG. 3 shows a cross section through the connection of a node element to a tube of the furniture system according to the invention.

The tube 200 comprises an outer casing 201 of chrome-plated steel. Accommodated in the outer casing is an inner tube 210 having an outer layer 211 of an insulating material, for example a plastic, and an inner layer 212 of a conductive material, for example copper. The inner tube 210 does not extend as far as the ends of the tube 200, but ends at a predefined distance therefrom of about 10 cm, for instance. In the fastened state, the outer casing 201 contacts with its free end the node element 100 in the region of the outer part 101 thereof. For the enlargement of the contact surface, the outer casing 201, unlike in the represented illustrative embodiment, can have on the end face a geometry tailored to the spherical surface.

For the fastening of the tube 200 to the node element 100, two substantially equally constructed wedge sleeves 221, 222 and a head screw 230 made of electrically conductive material are accommodated in the tube 200, wherein the head screw 230 is placed through the two wedge sleeves 221, 222 and is screwed with the end of its threaded shank 231 into the associated threaded bore 120 of the node element 100. The front wedge sleeve 221, which is facing the node element 100, is produced from an electrically non-conductive material or has, in the region of the contact surface with the tube 200, head screw 230 and/or node element 100, an electrical insulation. Between the head 232 of the screw 230 and that end face of the wedge sleeve 222 which is facing away from the node element 100 are disposed an insulator ring 241 made of an electrically insulating material, for example a plastic, and a contact ring 242 made of an electrically conductive material, for example copper plate. The contact ring 242 comprises an annular main part 243 and a resilient contact part 244 disposed circumferentially on the outside. The latter contacts, in the assembled state, the inner layer 212 of the inner tube 210.

The wedge sleeves 221, 222 are supported one against the other with their wedge surfaces angled obliquely to the sleeve axis, and abut against the head 232 of the screw 230 with their end face facing away from the node element 100. The outer diameter of the wedge sleeves 221, 222 is smaller than the inner diameter of the tube end only by that play which enables the tube end to be smoothly easily slipped onto these same. If, after the tube 200 has been slipped onto the wedge sleeves 221, 222, the screw head 230 is tightened, the wedge sleeves 221, 222 are forced against the inner side of the tube end and secure it. The displacement of the wedge sleeve abutting against the screw head further has a displacement component which is directed towards the node element 100 and which seeks to transport the tube 200 towards the node element 100 and thereby ensures the secure contacting between the outer casing 201 of the tube 200 and the outer part 101 of the node element 100.

For the tightening and loosening of the head screw 230, its head 232 is provided with a polygonal insertion hole 233 (or alternatively with a slot for the engagement of a screwdriver). Also that end of the threaded shank 231 of the screw 230 which is opposite to the head 232 has a polygonal insertion hole 234 for the insertion of a key.

In the case of relatively short tubes, the head 232 of the screw 230 is reachable by means of a screwdriver or screw key. In many cases, such as, for example, in the creation of a corner joint, the polygonal insertion hole 234 of the threaded shank 231 of the screw 230 is accessible through the unused opening of the threaded bore 120, which opening emerges in a diametrically opposite position in the node element 100, by means of a corresponding polygonal screw key. Moreover, it has been shown that, in wedge sleeves which as yet bear only weakly against the inner side of the tube, a snug tightening or a loosening of the screw 230 is also possible by appropriate rotation of the tube 200 about its axis.

Those openings of the threaded bores 110, 120 which in a tube connection are unused are advantageously each closed off by a grub screw after the screws 230 have been tightened.

In the connected state, current can be transmitted bipolarly between the tubes 200 and the node element 100. For the contacting of the first polarity (neutral conductor), the outer casing 201 of the tube 200 directly contacts the outer part 101 of the node element 100. The second polarity (phase) is carried in the region of the tube 200 in the inner layer 212 of the inner tube 210. There the current is tapped by the resilient contact part 244 of the contact ring 242 and transmitted via the main part 243 onto the head 232 of the screw 230. Via the threaded part 231 of the screw 230 and the thread 121 of the threaded bore 120 of the node element 100, the contacting of the inner part 102 of the node element 100 then takes place. Further tubes connected in the same way to the nodal element 100 are thus electrically connected bipolarly to the corresponding conductors of the tube 200 via the outer part 101 and the inner part 102.

Figure 4:
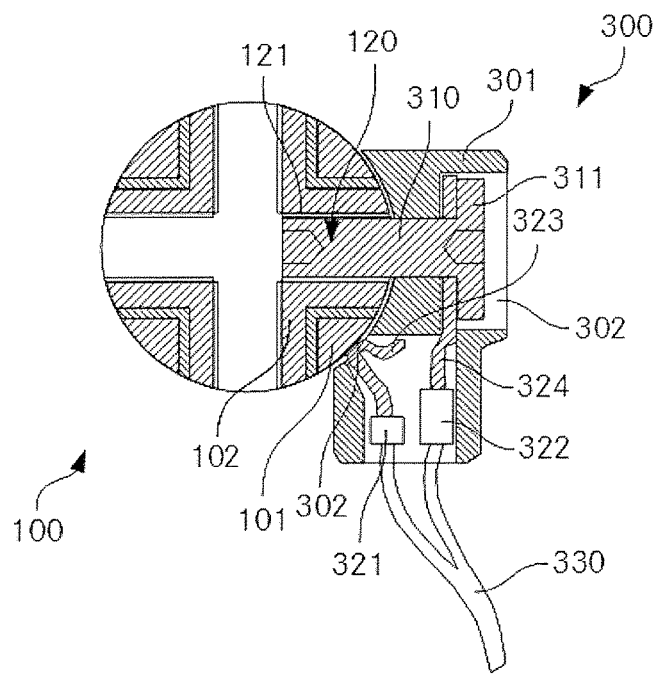
FIG. 4 a cross section through a node element with attached contacting element.

FIG. 4 shows a cross section through a node element 100 with attached contacting element 300. The contacting element 300 comprises a housing 301 having a receiving bore 302 for a retaining screw 310. Further accommodated in the housing are two connection points 321, 322 for a two-pole connection cable 330. Conductively connected to each of the connection points 321, 322 is a contact element 323, 324. One of the contact elements 323 is resiliently configured and passes out of the housing 301 through an opening 302 in the housing 301, which opening, in the fastened state, faces towards the node element 100. The other contact element 324 comprises an annular portion, which surrounds the receiving bore 302 at its rear end facing away from the node element 100.

The contacting element 300 can be fastened by simple screwing of the retaining screw 310 in any chosen opening of a threaded bore 120 of the node element 100. The head 311 of the retaining screw 310 contacts that portion of the contact element 324 which surrounds the receiving bore 302. Via the retaining screw 310 and the thread 131, a contact to the inner part 102 of the node element 100 is created. The second polarity is transmitted via the other contact element 323, which bears resiliently directly against the outer part 101 of the node element 100.

With the aid of the contacting element 300, both current carried in the furniture system can in principle be tapped and a furniture system can be supplied with current. The voltage carried in the furniture system should for safety reasons not exceed 48 V, a very suitable voltage value being 24 V.

The invention is not limited to the represented illustrative embodiment. Thus, in particular, the mechanical and/or electrical contacting between tube and node element can be achieved differently. The node element can be produced differently, for example by an inner part and a multipart outer part being produced separately from each other and then being put together. In place of the injected insulating layer, rings of insulating material can be inserted from outside into the interspaces between the inner and outer part.

The current can be carried differently in the tubes, so coatings applied to the inner side of the outer casing can be used in place of the inner tube. Conduction by means of cables is also conceivable.

By way of summary, it can be stated that the invention provides a furniture system which has a simple structure and mechanically robust devices for the power supply.

The invention claimed is:

1. A furniture system having a three-dimensional load-bearing tubular structure, comprising a plurality of tubes and a plurality of three-dimensional electrically conductive node elements,
    wherein at least one of the tubes has two mutually insulated current conductors for carrying, respectively, current of a first polarity and current of a second polarity along the tube,
    wherein the node elements each comprise a plurality of connection points for mechanically fastening two or more of said plurality of tubes to the node elements and
    wherein at least one of the node elements has two conductive regions to carry electrical current of said first and second polarities, respectively, said two conductive regions being insulated from each other by an insulative region,
    wherein the two mutually electrically insulated regions of the at least one node element connect the currents of the two electrical polarities to the two mutually insulated current conductors of the at least one tube at the connection points for the tube,
    whereby said furniture system is configured, following the mechanical fastening of the at least one tube to the at least one node element, so that the two mutually insulated current conductors of the at least one tube are electrically connected to the two mutually electrically insulated regions of the at least one node element,
    wherein the furniture system further comprises connectors joining the node elements to the tubes at the connection points of the node elements, creating, an electrical connection between the node elements and the tubes attached thereto,
    wherein the two mutually insulated current conductors for carrying current in said at least one of the tubes are arranged coaxially to each other, and
    wherein the at least one tube comprises a structural tube element made of a conductive material, which constitutes a first of the two mutually insulated current conductors and serves to carry the current of the first polarity, and an inner conductor insulated from the structural tube element for carrying the current of the second polarity, which constitutes a second of the two mutually insulated current conductors, said first and second conductors being insulated from each other by said insulative region.

2. The furniture system according to claim 1, wherein the first of the two mutually electrically insulated regions of the at least one node element is constituted by an outer part made of a conductive material, and wherein a second of the two mutually electrically insulated regions of the at least one node element is constituted by an inner part made of a conductive material, and wherein the outer part and the inner part are electrically insulated from each other by an intervening separation layer of electrically insulating material.

3. The furniture system according to claim 2, wherein current of the first electrical polarity is carried on the outer part of the at least one node element.

4. The furniture system according to claim 2, wherein the inner part of each node element has threads for fastening of the two or more tubes.

5. The furniture system according to claim 4, wherein a first of the two electrically insulated regions includes an outer surface of the outer part of the node element and a second of the two electrically insulated regions comprises said threads.

6. The furniture system according to claim 2, wherein the outer part and the inner part are produced from a metallic material.

7. The furniture system according to claim 1, wherein the connectors create a mechanically loadable fastening between a contact element and the tube attached thereto.

8. The furniture system according to claim 1, wherein the connectors comprise:
   a) a mechanical fastening element associated with a tube to be fastened to a node element and a screw for tensioning said mechanical element, wherein the screw is configured to cooperate with a thread of one of the node elements, and
   b) an electrical contact element for contacting the screw and the inner conductor of the tube held by the mechanical fastening element.

9. The furniture system according to claim 7, wherein the connectors comprise:
   a) a mechanical fastening element associated with a tube to be fastened to a node element and a screw for tensioning said mechanical element, wherein the screw is configured to cooperate with a thread of one of the node elements, and
   b) an electrical contact element for contacting the screw and an inner conductor of the tube held by the mechanical fastening element.

* * * * *